US011971149B2

(12) United States Patent
Muto et al.

(10) Patent No.: US 11,971,149 B2
(45) Date of Patent: Apr. 30, 2024

(54) VEHICLE LAMP

(71) Applicant: Ichikoh Industries, Ltd., Isehara (JP)

(72) Inventors: Takashi Muto, Isehara (JP); Yoshihiro Sugie, Isehara (JP); Eiji Suzuki, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/002,672

(22) PCT Filed: Jun. 17, 2021

(86) PCT No.: PCT/JP2021/022992
§ 371 (c)(1),
(2) Date: Dec. 21, 2022

(87) PCT Pub. No.: WO2021/261366
PCT Pub. Date: Dec. 30, 2021

(65) Prior Publication Data

US 2023/0243479 A1 Aug. 3, 2023

(30) Foreign Application Priority Data

Jun. 24, 2020 (JP) ................................. 2020-108698

(51) Int. Cl.
*F21S 41/00* (2018.01)
*F21S 41/148* (2018.01)
(Continued)

(52) U.S. Cl.
CPC ............. *F21S 41/43* (2018.01); *F21S 41/148* (2018.01); *F21S 41/27* (2018.01); *F21S 41/321* (2018.01); *F21S 41/365* (2018.01)

(58) Field of Classification Search
CPC .......... F21S 41/43; F21S 41/365; F21S 41/27; F21S 41/148; F21S 41/321
See application file for complete search history.

(56) References Cited

U.S. PATENT DOCUMENTS

2011/0170308 A1* 7/2011 Kinoshita ............... F21S 41/47 362/516
2012/0014125 A1* 1/2012 Uchida ................... F21S 41/60 362/538

(Continued)

FOREIGN PATENT DOCUMENTS

JP 2001-202808 A 7/2001
JP 2010-80075 A 4/2010

(Continued)

OTHER PUBLICATIONS

International Search Report dated Jul. 27, 2021 in PCT/JP2021/022992, filed on Jun. 17, 2021, 2 pages.

(Continued)

*Primary Examiner* — Gerald J Sufleta, II
(74) *Attorney, Agent, or Firm* — Oblon, McClelland, Maier & Neustadt, L.L.P.

(57) ABSTRACT

Sunlight incident in a lamp through a lens is prevented from being collected on a portion formed between a front end of a reflector and a lens holding frame through an opening formed in front of the portion. A vehicle lamp includes a light emitting portion, a lens that projects light emitted from the light emitting portion, a reflector including a first reflective surface that reflects light emitted from the light emitting portion toward the lens, an opening formed between a front end of the reflector and a frame, the frame that holds the lens, and a second reflective surface that is formed between the front end of the reflector and the frame, and reflects external light incident in the vehicle lamp through the lens.

5 Claims, 8 Drawing Sheets

(51) Int. Cl.

| | |
|---|---|
| ***F21S 41/27*** | (2018.01) |
| ***F21S 41/32*** | (2018.01) |
| ***F21S 41/365*** | (2018.01) |
| ***F21S 41/43*** | (2018.01) |

(56) References Cited

U.S. PATENT DOCUMENTS

| | | | | |
|---|---|---|---|---|
| 2016/0281953 | A1* | 9/2016 | Kono | F21S 41/365 |
| 2017/0211774 | A1* | 7/2017 | Harrington, Jr. | F21S 41/29 |
| 2019/0234578 | A1* | 8/2019 | Nakanishi | F21S 41/675 |
| 2021/0025562 | A1* | 1/2021 | Sato | F21S 41/33 |

FOREIGN PATENT DOCUMENTS

| | | | |
|---|---|---|---|
| JP | 2018-073775 | A | 5/2018 |
| JP | 2019-149284 | A | 9/2019 |

OTHER PUBLICATIONS

Office Action issued Dec. 5, 2023, in corresponding Japanese Patent Application No. 2020-108698 (with English Translation), 9 pages.

* cited by examiner

VEHICLE LAMP

TECHNICAL FIELD

The present invention relates to a vehicle lamp.

BACKGROUND ART

As a vehicle lamp, there is known a vehicle lamp to which a measure (hereinafter, referred to as a "sunlight countermeasure") is applied to prevent sunlight from being collected in the lamp by a projection lens, thereby causing a light collecting portion in the lamp to become hot (see, for example, PTL 1). The vehicle lamp described in PTL 1 includes a main reflector having a reflective surface formed on its inner surface, an additional reflector made of metal, a light distribution control unit made of resin, and a base portion made of resin and configured to support these components, and is configured in such a way that reflected light from the main reflector is incident on the additional reflector and the light distribution control unit. In the vehicle lamp, the light distribution control unit is disposed in such a way that the light collecting portion avoids sunlight incident in the lamp from the projection lens, and a front end of the additional reflector made of metal is disposed at or near a rear focal point of the projection lens.

CITATION LIST

Patent Literature

PTL 1: Japanese Unexamined Patent Application Publication No. 2019-149284

SUMMARY OF THE INVENTION

Problems to be Solved by the Invention

By the way, a portion including a reflective surface for an overhead sign (hereinafter referred to as "OHS") may be added to a front end of a main reflector (hereinafter, simply referred to a "reflector"). In this case, whereas a reflective surface for OHS is formed on an inner surface of the portion by aluminum vapor deposition, highly reflective coating, or the like, generally, resin is exposed on an outer surface or an end surface of the portion. In a case where an opening is formed between a front end of a reflector and a lens holding frame as a measure against heat, it is conceived that sunlight may be collected on an outer surface or an end surface of the portion through the opening, thereby causing the portion to become hot.

The present invention has been made to solve the problem as described above, and an object of the present invention is to prevent sunlight incident in a lamp through a lens from being collected on a portion formed between a front end of a reflector and a lens holding frame through an opening formed in front of the portion.

Means for Solving the Problem

The present invention includes a light emitting portion; a lens that projects light emitted from the light emitting portion; a reflector including a first reflective surface that reflects the light emitted from the light emitting portion toward the lens; a frame that holds the lens; an opening formed between a front end of the reflector and the frame; and a second reflective surface that is formed between the front end of the reflector and the frame, and reflects external light incident in the lamp through the lens.

Effect of the Invention

According to the present invention, external light incident in the lamp through the lens is reflected on the second reflective surface at a portion between the front end of the reflector and the lens holding frame. Therefore, it is possible to prevent sunlight incident in the lamp through the lens from being collected on the portion formed between the front end of the reflector and the lens holding frame through the opening formed in front of the portion.

MODE FOR CARRYING OUT THE INVENTION

Hereinafter, the present invention is described in accordance with preferred embodiments. Note that, the present invention is not limited to the embodiments described in the following, and may be modified as necessary within a range that does not depart from the gist of the present invention. Also, in the embodiments described in the following, there are parts in which illustration or description of some configurations is omitted, but it is needless to say that, regarding details of the omitted technique, a known or well-known technique is applied as necessary within a range that does not cause inconsistency with a content described in the following.

Figure 1:
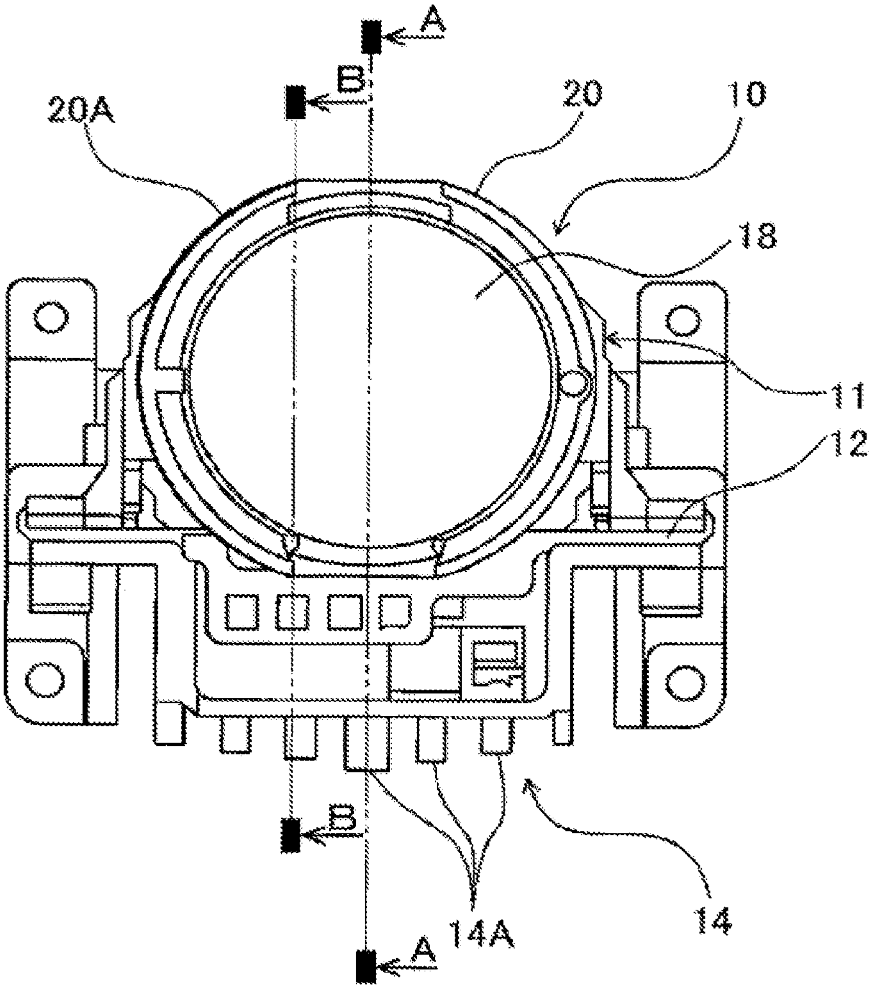
FIG. 1 is a front view illustrating a vehicle lamp according to an embodiment.
Figure 2:
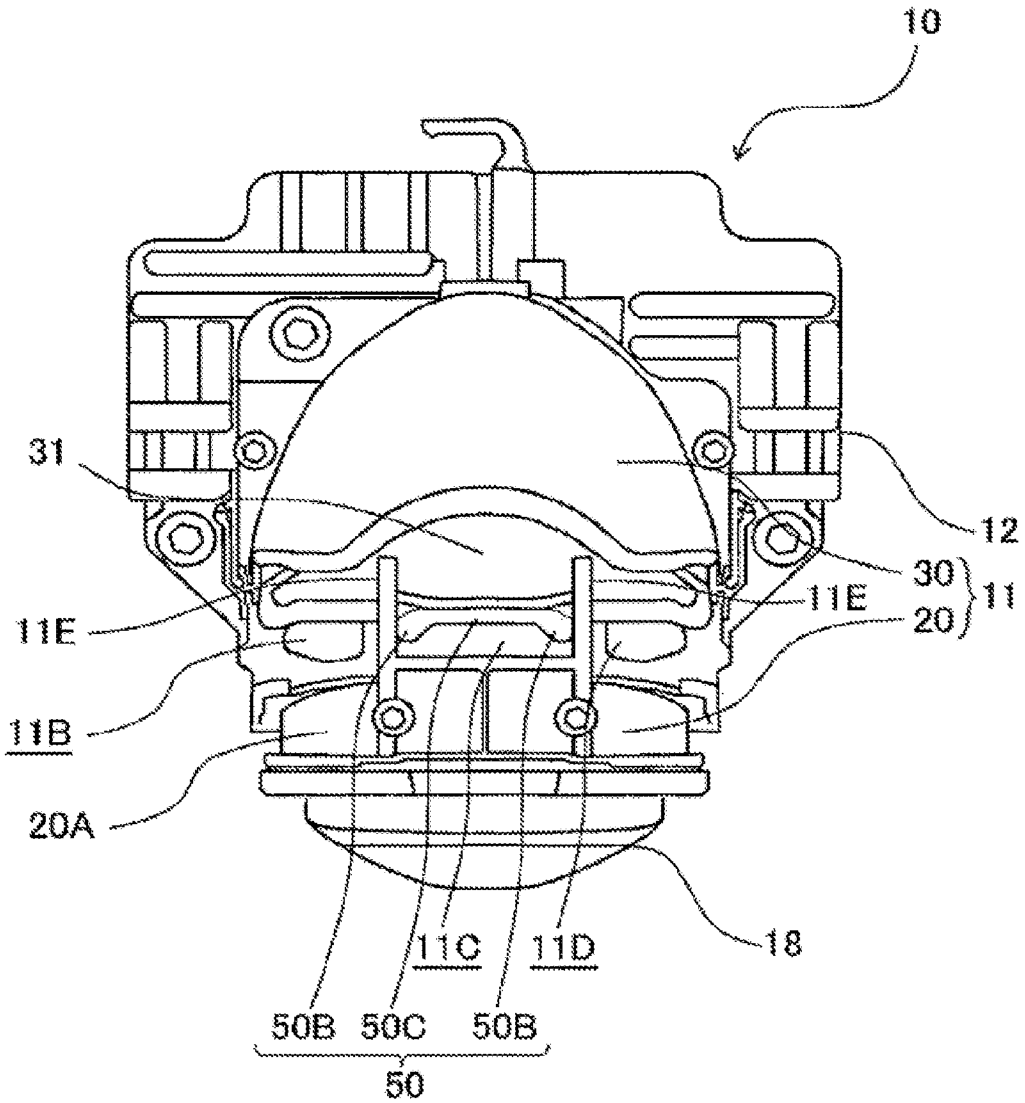
FIG. 2 is a plan view illustrating a vehicle lamp according to an embodiment.
Figure 3:
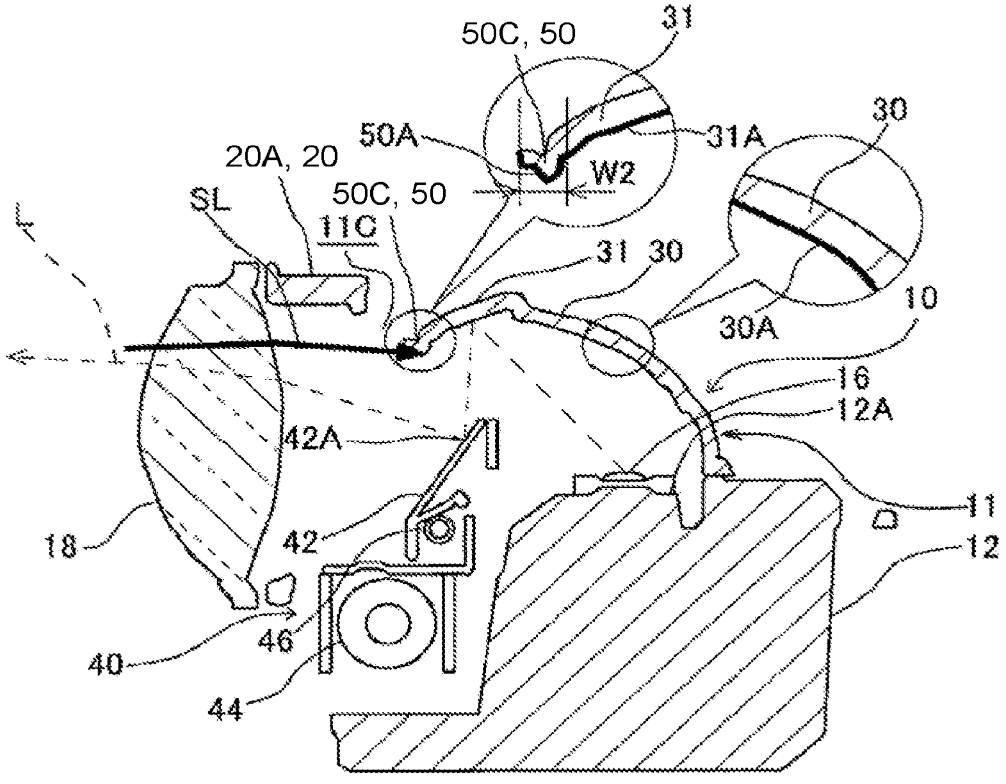
FIG. 3 is a cross-sectional view taken along the line A-A in FIG. 1.
Figure 4:
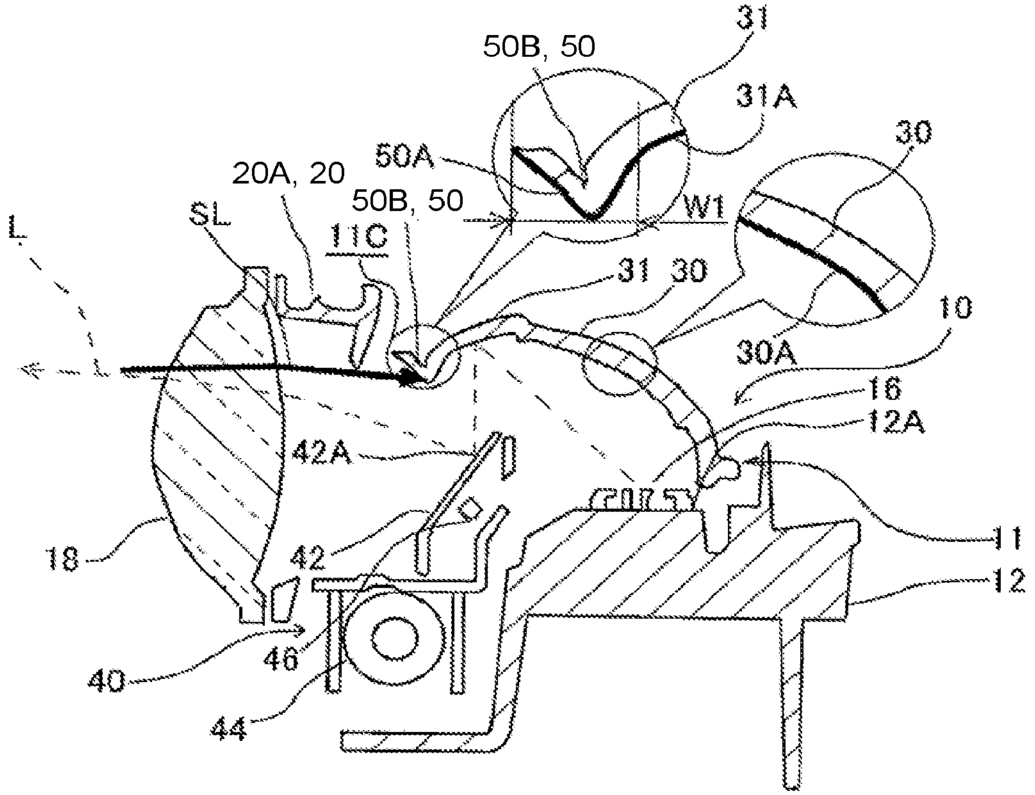
FIG. 4 is a cross-sectional view taken along the line B-B in FIG. 1.

FIG. 1 is a front view illustrating a vehicle lamp according to an embodiment. FIG. 2 is a plan view illustrating a vehicle lamp according to an embodiment. FIG. 3 is a cross-sectional view taken along the line A-A in FIG. 1. FIG. 4 is a cross-sectional view taken along the line B-B in FIG. 1. A vehicle lamp 10 illustrated in these diagrams is a front light of a vehicle, and illuminates a front area of the vehicle. Note that, "front" and "rear" used in description of a direction and a position are based on a front-rear direction of a vehicle in which the vehicle lamp 10 is mounted; "up", "down", and "vertical" used in description of a direction and a position are based on an up-down direction of the vehicle in which the vehicle lamp 10 is mounted; and "left", "right", and "lateral" used in description of a direction and a position are based on a width direction (left-right direction) of the vehicle in which the vehicle lamp 10 is mounted.

The vehicle lamp 10 includes a base portion 12, a heat sink 14 (see FIG. 1), a light emitting portion 16 (see FIGS. 3 and 4), a lens 18, a frame 20, a reflector 30 (see FIGS. 2 to 4), and a shade unit 40 (see FIGS. 3 and 4). In the vehicle lamp 10, the frame 20 and the reflector 30 are integrally formed, and the reflector 30 and the base portion 12 are screwed together into a single unit.

The heat sink 14 includes a plurality of heat dissipating fins 14A (see FIG. 1). The plurality of heat dissipating fins 14A are integrally formed on a lower surface of the base portion 12.

The light emitting portion 16 includes a light emitting diode, a substrate, a power feeding holder, and the like, and is mounted on an upper surface 12A (see FIGS. 3 and 4) of the base portion 12. The fins 14A are provided on a back surface of the upper surface 12A of the base portion 12, and heat generated in the light emitting portion 16 is released to the outside by the heat sink 14.

The lens 18 is disposed at a front end of the vehicle lamp 10, and projects light emitted from the light emitting portion 16 toward a front area of the vehicle. The lens 18 is held by the frame 20. The frame 20 is disposed on a front side of the vehicle lamp 10, and includes a circular lens holder 20A on which the lens 18 is mounted.

The reflector 30 is formed into a shape of a three-dimensional free curved surface based on an ellipse, and is designed in such a way as to cover the light emitting portion 16 and the upper surface 12A of the base portion 12. A first reflective surface 30A (see FIGS. 3 and 4) is formed on an inner surface of the reflector 30 by aluminum vapor deposition, highly reflective coating, or the like. Note that, the reflector 30 may be formed into a shape of a three-dimensional free curved surface formed by combining an ellipse and a parabola.

Herein, the vehicle lamp 10 includes a resin molded product 11 in which the frame 20 and the reflector 30 are formed into a single unit, and a reflective surface is formed on a predetermined area of an inner surface of this resin molded product 11 by aluminum vapor deposition, highly reflective coating, or the like.

As illustrated in FIGS. 3 and 4, the shade unit 40 switches a light distribution pattern to be projected forward of the vehicle by the lens 18 between a low-beam light distribution pattern and a high-beam light distribution pattern. The shade unit 40 includes a shade 42, a solenoid 44, and a link mechanism 46. The shade 42 is a light blocking plate disposed between the light emitting portion 16 and the lens 18. The shade 42 has two postures: an upright posture in which one surface faces forward and obliquely upward, and a retracted posture in which the one surface faces straight up. The solenoid 44 drives the link mechanism 46. The link mechanism 46 changes the shade 42 between the upright posture and an inclined posture by being driven by the solenoid 44.

When the shade 42 is in the upright posture, a part of light emitted from the light emitting portion 16 and reflected forward by the first reflective surface 30A of the reflector 30 is blocked by the shade 42, whereby a low-beam light distribution pattern including a cut-off line is projected forward of the vehicle. In contrast, when the shade 42 is in the retracted posture, light emitted from the light emitting portion 16 and reflected forward by the first reflective surface 30A of the reflector 30 is not blocked by the shade 42, whereby a high-beam light distribution pattern is projected forward of the vehicle.

Herein, the vehicle lamp 10 according to the present embodiment includes a first reflective surface 31A for OHS, and a second reflective surface 42A for OHS, and projects an OHS light distribution pattern above a low-beam light distribution pattern when the low-beam light distribution pattern is projected.

The second reflective surface 42A for OHS is formed on one surface of the shade 42. The one surface is a surface facing forward and obliquely upward when the shade 42 is in the upright posture. Note that, as the second reflective surface 42A for OHS, a metal base portion, aluminum formed by vapor deposition on a base portion of a base material such as metal, a highly reflective coated surface coated on a base portion of a base material such as metal, and the like can be exemplified.

A reflective plate 31 for OHS made of resin is integrally formed on a front end of the reflector 30. The reflective plate 31 for OHS extends forward and obliquely downward from the front end of the reflector 30, and includes an inner surface facing backward and obliquely downward. The first reflective surface 31A for OHS is formed on the inner surface of the reflective plate 31 for OHS by aluminum vapor deposition, highly reflective coating, or the like. A front end of the reflective plate 31 for OHS is located in front of and below the front end of the reflector 30.

As illustrated by the dashed line arrow L in FIGS. 3 and 4, when a low-beam light distribution pattern is projected, a part of light emitted from the light emitting portion 16 is reflected toward the second reflective surface 42A for OHS by the first reflective surface 31A for OHS, reflected toward the lens 18 by the second reflective surface 42A for OHS, and projected as an OHS light distribution pattern from the lens 18.

As illustrated in FIG. 2, openings 11B, 11C, 11D are formed in the resin molded product 11. These openings 11B, 11C, 11D are arranged side by side in a lateral direction between a light blocking portion 50 and the lens holder 20A. The light emitting portion 16 generates heat, and a heat flow from the light emitting portion 16 is released to the outside of the lamp through the openings 11B, 11C, 11D.

By the way, sunlight is collected in the vehicle lamp 10 through the lens 18. In particular, as illustrated by the bold line arrow SL in FIGS. 3 and 4, a part of sunlight incident in the vehicle lamp 10 through the lens 18 travels toward an outer surface or an end surface being a non-reflective surface of the reflective plate 31 for OHS through the opening 11C. Herein, resin is exposed on an outer surface or an end surface of the reflective plate 31 for OHS. In contrast, the light blocking portion 50 is integrally formed at a front end of the reflective plate 31 for OHS. The light blocking portion 50 is a bent portion bent into a V shape when viewed from a lateral direction, and includes a pair of obliquely downward slopes. A second reflective surface 50A is formed on the pair of slopes constituting the V-shaped bent portion of the light blocking portion 50 by aluminum vapor deposition, highly reflective coating, or the like. The light blocking portion 50 is located in front of and below the front end of the reflective plate 31 for OHS.

A part of sunlight incident in the vehicle lamp 10 through the lens 18 travels toward the reflective plate 31 for OHS through the opening 11C, and is reflected on the second reflective surface 50A in front of the reflective plate 31 for OHS. This prevents sunlight from being collected on an outer surface or an end surface of the reflective plate 31 for OHS. Also, sunlight incident in the vehicle lamp 10 through the lens 18 impinges only on the second reflective surface 50A of the light blocking portion 50, and does not impinge on a bare portion of the light blocking portion 50.

As illustrated in FIG. 2, a pair of ribs 11E are formed side by side in parallel to each other on an upper surface of the resin molded product 11. One of the ribs 11E is disposed between the openings 11B and 11C, and the other of the ribs 11E is disposed between the openings 11C and 11D.

Herein, the light blocking portion 50 includes a pair of first light blocking portions 50B (see FIGS. 2 and 4) formed on both ends of the light blocking portion 50 in a left-right direction, and a second light blocking portion 50C (see FIGS. 2 and 3) formed at a middle of the light blocking portion 50 in the left-right direction. The first light blocking portion 50B is integrally formed with the rib 11E, and the second light blocking portion 50C is integrally formed with the first light blocking portion 50B. The second light blocking portion 50C extends in the left-right direction between the pair of first light blocking portions 50B.

As illustrated in FIGS. 3 and 4, a width (length from a rear end to a front end) W1 of the first light blocking portion 50B, and a width (length from a rear end to a front end) W2 of the second light blocking portion 50C are different. Herein, in a case where a part of sunlight incident in the vehicle lamp 10 travels toward the rib 11E through the opening 11C, it is conceived that sunlight may also be collected on the rib 11E, depending on a size of the width W1 of the first light blocking portion 50B. However, in the present embodiment, the width W1 of the first light blocking portion 50B is wider than the width W2 of the second light blocking portion 50C, and sunlight directed toward the rib 11E through the opening 11C is reflected on the second reflective surface 50A of the first light blocking portion 50B.

As described above, in the vehicle lamp 10 according to the present embodiment, the openings 11B, 11C, and 11D are formed between the frame 20 and the reflector 30. This allows a heat flow from the heated light emitting portion 16 to be released to the outside of the vehicle lamp 10 through the openings 11B, 11C, 11D. On the other hand, a part of sunlight incident in the vehicle lamp 10 through the lens 18 travels toward an outer surface of the reflective plate 31 for OHS through the opening 11C. In view of the above, in the vehicle lamp 10 according to the present embodiment, the second reflective surface 50A is formed between a front end of the reflective plate 31 for OHS and the lens holder 20A, and the second reflective surface 50A reflects sunlight traveling toward the outer surface of the reflective plate 31 for OHS through the lens 18 and the opening 11C. This prevents sunlight incident in the vehicle lamp 10 through the lens 18 from being collected on the outer surface of the reflective plate 31 for OHS where resin is exposed through the opening 11C formed in front of the portion.

In addition, in the vehicle lamp 10 according to the present embodiment, the second reflective surface 50A is formed on the light blocking portion 50 located between the first reflective surface 31A for OHS and the lens holder 20A. Herein, the second reflective surface 50A is formed on an inner surface of an upper housing 11A, and the first reflective surface 30A of the reflector 30, the first reflective surface 31A for OHS of the reflective plate 31 for OHS, and the second reflective surface 50A are continued on the inner surface of the upper housing 11A. Therefore, the second reflective surface 50A can be formed together with the first reflective surface 30A and the first reflective surface 31A for OHS at the same time. Therefore, for example, an additional reflective surface forming process, such as forming a reflective surface on an outer surface or an end surface of the reflective plate 31 for OHS can be eliminated, thereby reducing the number of processes and a cost.

Further, in the vehicle lamp 10 according to the present embodiment, the light blocking portion 50 including the second reflective surface 50A formed thereon is integrally formed with a front end of the reflective plate 31 for OHS, and the light blocking portion 50 is bent into a V-shape. Furthermore, the second reflective surface 50A is formed on a pair of downward slopes of the V-shaped light blocking portion 50. Forming a pair of downward slopes on the light blocking portion 50 allows a surface on which the second reflective surface 50A is formed to become an inner surface of the resin molded product 11. Therefore, as described above, the second reflective surface 50A can be formed together with the first reflective surface 30A of the reflector 30 and the first reflective surface 31A for OHS of the reflective plate 31 for OHS at the same time. Also, forming the light blocking portion 50 located in front of the reflective plate 31 for OHS into a V-shape allows the light blocking portion 50 to exhibit an advantageous effect against sunlight without blocking outgoing light for OHS.

Further, in the vehicle lamp 10 according to the present embodiment, the ribs 11E are integrally formed on an outer surface being a non-reflective surface of the light blocking portion 50. The light blocking portion 50 located in the vicinity of the rib 11E includes the first light blocking portion 50B that is integrally formed with the rib 11E, and the second light blocking portion 50C that is integrally formed with the first light blocking portion 50B and away from the rib 11E. Herein, the length W1 from a rear end to a front end of the first light blocking portion 50B is longer than the length W2 from a rear end to a front end of the second light blocking portion 50C. This allows sunlight directed toward the rib 11E through the lens 18 and the opening 11C to be reflected on the second reflective surface 50A of the first light blocking portion 50B. Therefore, it is possible to prevent sunlight from being collected on the rib 11E where resin is exposed.

Furthermore, in the vehicle lamp 10 according to the present embodiment, a part of sunlight incident in the vehicle lamp 10 through the lens 18 impinges only on the second reflective surface 50A of the light blocking portion 50, and does not impinge on a bare portion of the light blocking portion 50. Therefore, it is possible to prevent sunlight from being collected on a portion of the light blocking portion 50 where resin is exposed.

Figure 5:
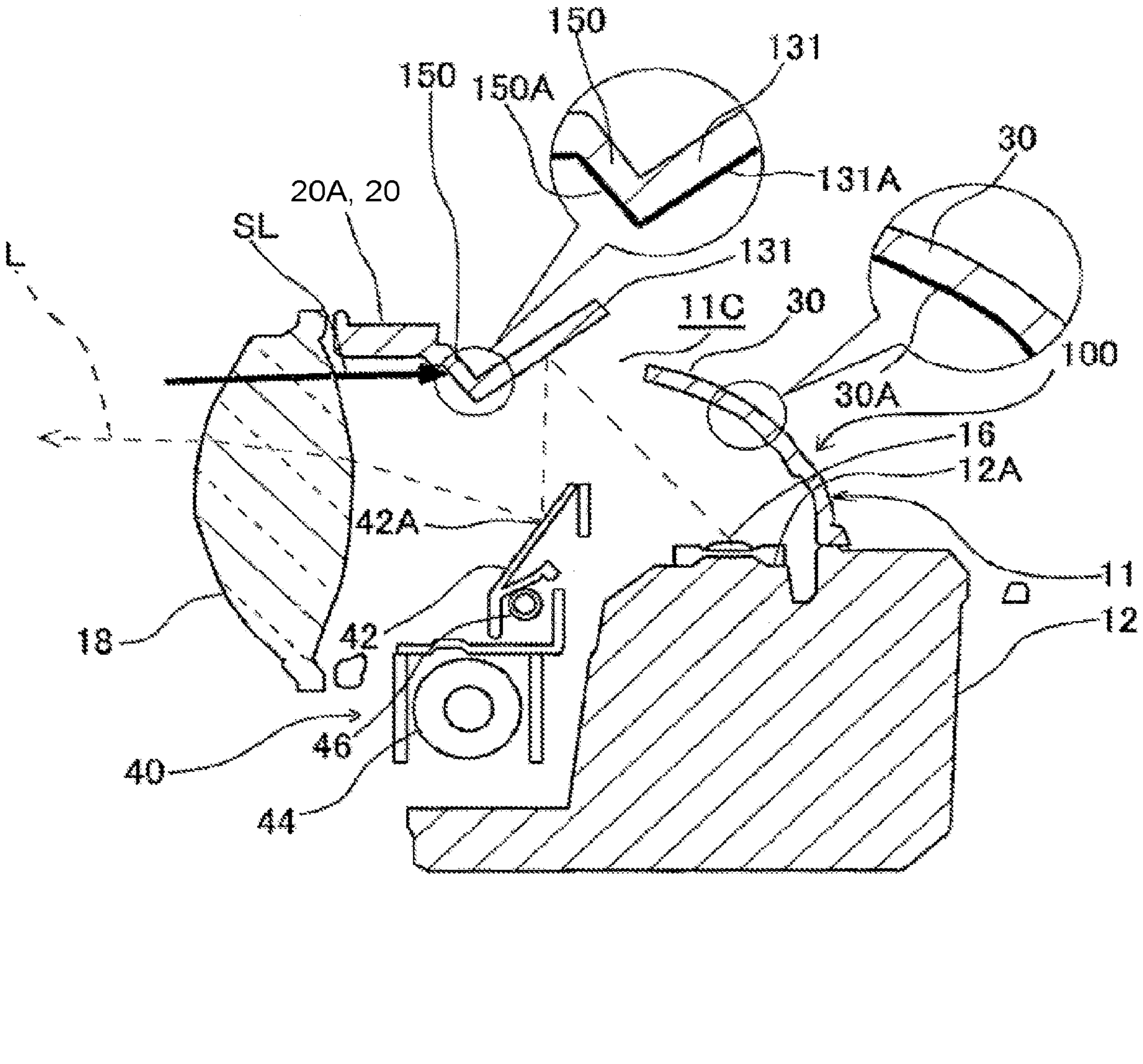
FIG. 5 is a cross-sectional view illustrating a vehicle lamp according to another embodiment.

FIG. 5 is a cross-sectional view illustrating a vehicle lamp 100 according to another embodiment. Note that, a same reference sign is attached to a similar configuration to that in the above embodiment, and description in the above embodiment is applied. As illustrated in FIG. 5, the vehicle lamp 100 according to the present embodiment includes a light blocking portion 150 integrally formed with a lens holder 20A, and a reflective plate 131 for OHS integrally formed with the light blocking portion 150.

An opening 11C and unillustrated openings 11B and 11D (see FIG. 2) are formed between a front end of a reflector 30 and a rear end of the reflective plate 131 for OHS. A light emitting portion 16 generates heat, and a heat flow from the light emitting portion 16 is released to the outside of the vehicle lamp 100 through the openings 11B, 11C, and 11D.

The light blocking portion 150 extends backward and obliquely downward from a rear end of the lens holder 20A, and includes an inner surface facing forward and obliquely downward. A second reflective surface 150A is formed on the inner surface of the light blocking portion 150 by aluminum vapor deposition, highly reflective coating, or the like. A rear end of the light blocking portion 150 is disposed in front of and below the front end of the reflector 30.

The reflective plate 131 for OHS extends backward and obliquely upward from the rear end of the light blocking portion 150, and includes an inner surface facing backward and obliquely downward. A first reflective surface 131A for OHS is formed on the inner surface of the reflective plate 131 for OHS by aluminum vapor deposition, highly reflective coating, or the like.

Figure 6:
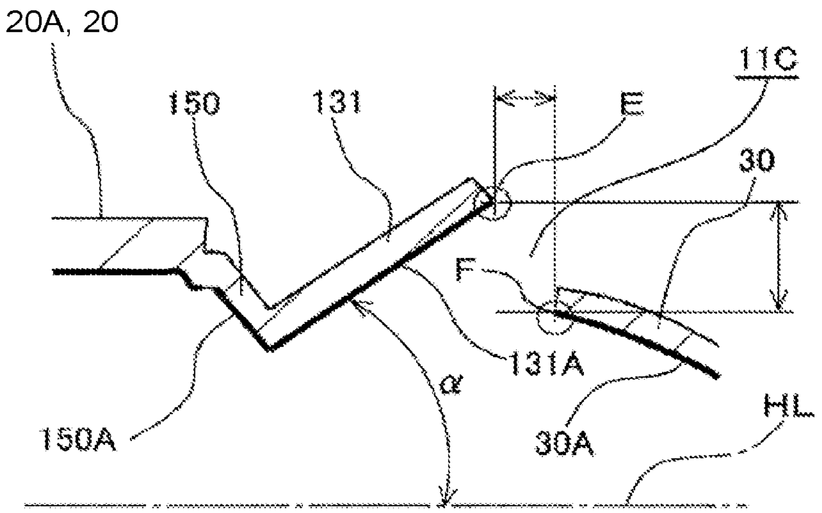
FIG. 6 is a cross-sectional view enlargedly illustrating a part of the vehicle lamp illustrated in FIG. 5.

FIG. 6 is a cross-sectional view enlargedly illustrating a part of the vehicle lamp 100 illustrated in FIG. 5. As illustrated in FIG. 6, a rear end E of the reflective plate 131 for OHS is disposed in front of and above a front end F of the reflector 30. An angle α between the first reflective surface 131A for OHS and a horizontal line HL parallel to the front-rear direction of the vehicle satisfies the following formula (1).

$$0<\alpha<90° \quad (1)$$

As illustrated by the dashed line arrow L in FIG. 5, when a low-beam light distribution pattern is projected, a part of light emitted from the light emitting portion 16 is reflected toward a second reflective surface 42A for OHS by the first reflective surface 131A for OHS, is reflected toward the lens 18 by the second reflective surface 42A for OHS, and is projected as an OHS light distribution pattern from the lens 18.

As illustrated by the bold line arrow SL in FIG. 5, a part of sunlight incident in the vehicle lamp 100 through the lens 18 travels toward an outer surface being a non-reflective surface of the reflective plate 131A for OHS, and is reflected in front of the outer surface by the second reflective surface 150A. This prevents sunlight from being collected on the outer surface of the reflective plate 131A for OHS. Also, sunlight impinges only on the second reflective surface 150A of the light blocking portion 150, and does not impinge on a bare portion of the light blocking portion 150.

Figure 7:
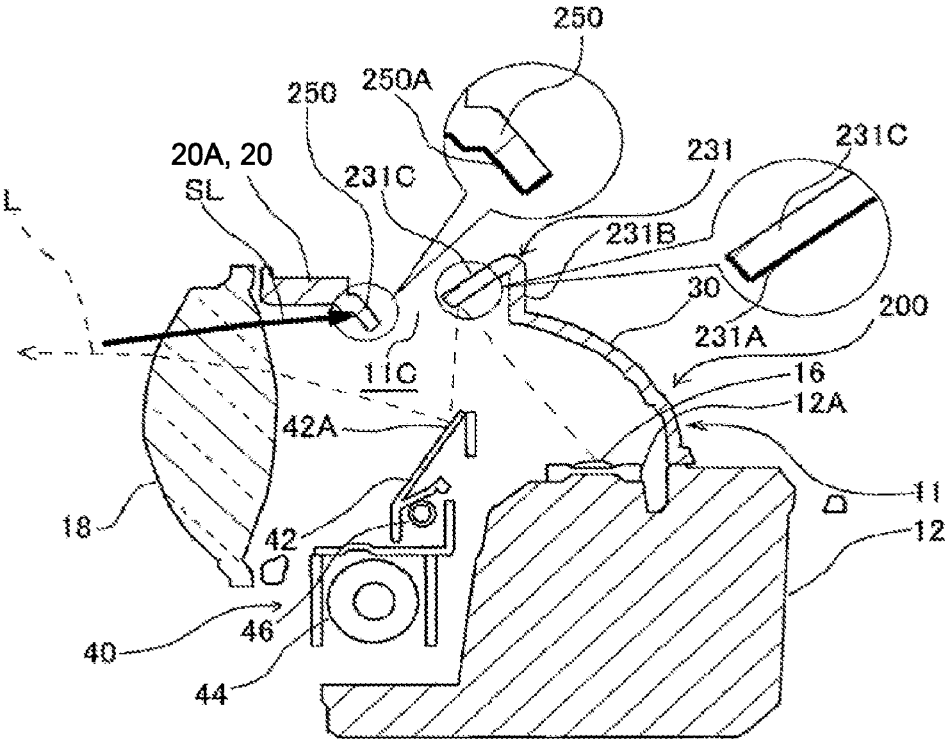
FIG. 7 is a cross-sectional view illustrating a vehicle lamp according to another embodiment.

FIG. 7 is a cross-sectional view illustrating a vehicle lamp 200 according to another embodiment. Note that, a same reference sign is attached to a similar configuration to that in the above embodiments, and description in the above embodiments is applied. As illustrated in FIG. 7, the vehicle lamp 200 according to the present embodiment includes a reflective plate 231 for OHS integrally formed with a front end of a reflector 30, and a light blocking portion 250 integrally formed with a rear end of a lens holder 20A.

An opening 11C and unillustrated openings 11B and 11D (see FIG. 2) are formed between a front end of the reflective plate 231 for OHS and a rear end of the light blocking portion 250. A light emitting portion 16 generates heat, and a heat flow from the light emitting portion 16 is released to the outside of the lamp through the openings 11B, 11C, and 11D.

The light blocking portion 250 extends backward and obliquely downward from the rear end of the lens holder 20A, and includes an inner surface facing forward and obliquely downward. The inner surface of the light blocking portion 250 includes a second reflective surface 250A formed by aluminum vapor deposition, highly reflective coating, or the like. The rear end of the light blocking portion 250 is disposed in front of and below the front end of the reflector 30.

The reflective plate 231 for OHS includes a vertical plate portion 231B extending upward from the front end of the reflector 30, and an inclined plate portion 231C extending forward and obliquely downward from an upper end of the vertical plate portion 231B. The reflective plate 231 for OHS is formed into an inverted V-shape when viewed in a lateral direction. The inclined plate portion 231C includes an inner surface facing backward and obliquely downward. A first reflective surface 231A for OHS is formed on the inner surface of the inclined plate portion 231C by aluminum vapor deposition, highly reflective coating, or the like.

Figure 8:
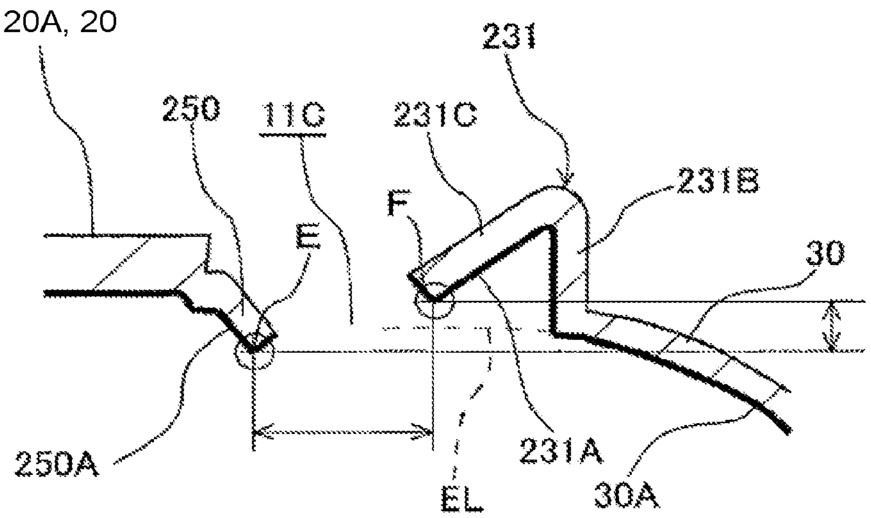
FIG. 8 is a cross-sectional view enlargedly illustrating a part of the vehicle lamp illustrated in FIG. 7.

FIG. 8 is a cross-sectional view enlargedly illustrating a part of the vehicle lamp 200 illustrated in FIG. 7. As illustrated in FIG. 8, a front end F of the inclined plate portion 231C is disposed on an upper side with respect to an extension EL extending forward on an inner surface of the reflector 30. A rear end E of the light blocking portion 250 is disposed in front of and below the front end F of the inclined plate portion 231C.

As illustrated by the dashed line arrow L in FIG. 7, when a low-beam light distribution pattern is projected, a part of light emitted from the light emitting portion 16 is reflected toward a second reflective surface 42A for OHS by the first reflective surface 231A for OHS, reflected toward a lens 18 by the second reflective surface 42A for OHS, and projected as an OHS light distribution pattern from the lens 18.

As illustrated by the bold line arrow SL in FIG. 7, a part of sunlight incident in the vehicle lamp 200 through the lens 18 travels toward an outer surface being a non-reflective surface of the reflective plate 231 for OHS, and is reflected by the second reflective surface 250A in front of the outer surface. This prevents sunlight from being collected on the outer surface of the reflective plate 231A for OHS. Also, sunlight impinges only on the second reflective surface 250A of the light blocking portion 250, and does not impinge on a bare portion of the light blocking portion 250.

Although the present invention has been described based on the embodiments, the present invention is not limited to the above embodiments, and may be modified within a range that does not depart from the gist of the present invention. Techniques of the embodiments may be combined with each other, or publicly known or well-known techniques may be combined with the embodiments.

For example, in the above embodiments, a portion formed between a front end of the reflector 30 and the lens holder 20A is formed as the reflective plate 31, 131, 231 for OHS. However, the portion may be formed as an independent portion constituting the resin molded product 11. Further, in the above embodiments, the reflector 30 and the lens holder 20A are molded as a single unit, but the reflector 30 and the lens holder 20A may be molded separately and then integrated.

Further, the above embodiments have been described by way of the Hi/Lo switchable vehicle lamps 10, 100, and 200 as examples. However, the present invention can also be applied to a vehicle lamp exclusively for a low beam.

DESCRIPTION OF REFERENCE NUMERALS

10: vehicle lamp
11B: Opening
11C: Opening
11D: Opening
11E: Rib
16: Light emitting portion
18: Lens
20: Frame
20A: Lens holder
30: Reflector
30A: First reflective surface
31: Reflective plate for OHS (reflective plate)
31A: First reflective surface for OHS (first reflective surface for overhead sign)
42A: Second reflective surface for OHS (second reflective surface for overhead sign)
50: Light blocking portion
50A: Second reflective surface
50B First light blocking portion

50C Second light blocking portion
100: vehicle lamp
131A: First reflective surface for OHS (first reflective surface for overhead sign)
150A: Second reflective surface
200: vehicle lamp
231A: First reflective surface for OHS (first reflective surface for overhead sign)
250A: Second reflective surface
W1: Width (length from rear end to front end of first light blocking portion)
W2: Width (length from rear end to front end of second light blocking portion)

The invention claimed is:

1. A vehicle lamp comprising:
a light emitting portion;
a lens that projects light emitted from the light emitting portion;
a reflector including a first reflective surface that reflects the light emitted from the light emitting portion toward the lens;
a frame that holds the lens;
an opening formed between a front end of the reflector and the frame;
a first overhead sign reflective surface for an overhead sign that is formed between the front end of the reflector and the frame, and reflects the light emitted from the light emitting portion; and
a second reflective surface that is formed between the first overhead sign reflective surface for the overhead sign and the frame, and reflects external light incident in the lamp through the lens.

2. The vehicle lamp according to claim 1, further comprising:
a second overhead sign reflective surface for the overhead sign that reflects, toward the lens, the light emitted from the light emitting portion and reflected on the first overhead sign reflective surface for the overhead sign.

3. The vehicle lamp according to claim 1, further comprising:
a reflective plate including the first overhead sign reflective surface for the overhead sign formed thereon, and integrally formed with the front end of the reflector; and
a light blocking portion including the second reflective surface formed thereon, and integrally formed with a front end of the reflective plate, wherein
the light blocking portion is bent into a V-shape, and
the second reflective surface is formed on a pair of downward slopes constituting a V-shaped bent portion of the light blocking portion.

4. The vehicle lamp according to claim 3, further comprising
a rib that is integrally formed with an outer surface being a non-reflective surface of the light blocking portion, wherein
the light blocking portion includes
a first light blocking portion that is integrally formed with the rib, and
a second light blocking portion that is integrally formed with the first light blocking portion and away from the rib, wherein
a length from a rear end to a front end of the first light blocking portion is longer than a length from a rear end to a front end of the second light blocking portion.

5. A vehicle lamp comprising:
a light emitting portion;
a lens that projects light emitted from the light emitting portion;
a reflector including a first reflective surface that reflects the light emitted from the light emitting portion toward the lens;
a frame that holds the lens;
an opening formed between a front end of the reflector and the frame;
a second reflective surface that is formed between the front end of the reflector and the frame, and reflects external light incident in the lamp through the lens;
a first overhead sign reflective surface for an overhead sign that is formed between the front end of the reflector and the frame, and reflects the light emitted from the light emitting portion; and
a second overhead sign reflective surface for the overhead sign that reflects, toward the lens, the light emitted from the light emitting portion and reflected on the first overhead sign reflective surface for the overhead sign, wherein
the second reflective surface is disposed between the first overhead sign reflective surface for the overhead sign and the frame.

* * * * *